(12) United States Patent
Won et al.

(10) Patent No.: US 12,405,004 B2
(45) Date of Patent: Sep. 2, 2025

(54) REACTOR APPARATUS

(71) Applicant: Samsung Electronics Co., Ltd., Suwon-si (KR)

(72) Inventors: Inho Won, Yongin-si (KR); Juhyun Lee, Suwon-si (KR); Jungju Lee, Suwon-si (KR); Byungchan Lim, Chungju-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 583 days.

(21) Appl. No.: 17/854,690

(22) Filed: Jun. 30, 2022

(65) Prior Publication Data

US 2023/0001343 A1 Jan. 5, 2023

(30) Foreign Application Priority Data

Jul. 2, 2021 (KR) ........................ 10-2021-0087146

(51) Int. Cl.
*F23G 7/06* (2006.01)
*B01D 53/02* (2006.01)
(Continued)

(52) U.S. Cl.
CPC ............ *F23G 7/065* (2013.01); *B01D 53/025* (2013.01); *B01D 53/185* (2013.01); *B01J 6/00* (2013.01);
(Continued)

(58) Field of Classification Search
CPC ................ B01D 53/025; B01D 53/185; B01D 2252/103; B01D 2258/0283; B01D 53/18;
(Continued)

(56) References Cited

U.S. PATENT DOCUMENTS 7,854,792 B2    12/2010  Johnsgard

FOREIGN PATENT DOCUMENTS

GB    2308991 A  *  7/1997  ............. B01D 53/46
JP    4015399 B2    11/2007
(Continued)

*Primary Examiner* — Lessanework Seifu
(74) *Attorney, Agent, or Firm* — Harness, Dickey & Pierce, P.L.C.

(57) ABSTRACT

A reactor apparatus, includes: a reactor chamber having an inlet through which treatment liquid containing by-products is introduced and having an interior space; a burner at a lower end portion of the reactor chamber to burn waste gas; a guide member above the burner and configured to allow the treatment liquid to flow outwardly of the burner; a water reservoir between the burner and the guide member, the water reservoir having a double pipe structure having an inner wall portion and an outer wall portion, and through which water supplied through a water inlet is configured to flow between the inner wall portion and the outer wall portion; and a cover member coupled to an upper end portion of the water reservoir and configured to cover a space between the inner wall portion and the outer wall portion, wherein an upper end of the outer wall portion is above an upper end of the inner wall portion, wherein a plurality of bumps are on a bottom surface of the cover member spaced apart from each other in a circumferential direction, the plurality of bumps configured to form a gap of several hundred μm between the bottom surface of the cover member and an upper surface of the inner wall portion of the water reservoir.

20 Claims, 10 Drawing Sheets

(51) Int. Cl.
    *B01D 53/18*     (2006.01)
    *B01J 6/00*     (2006.01)
    *F23J 15/04*     (2006.01)

(52) U.S. Cl.
    CPC ......... *F23J 15/04* (2013.01); *B01D 2252/103* (2013.01); *F23G 2209/14* (2013.01)

(58) Field of Classification Search
    CPC . B01D 2258/0216; B01J 6/00; B01J 19/0073; F23G 7/065; F23G 2209/14; F23G 7/06; F23G 5/44; F23J 15/04; F23J 2217/50; F23D 14/72
    See application file for complete search history.

(56) References Cited

FOREIGN PATENT DOCUMENTS

| | | |
|---|---|---|
| KR | 100284324 B1 | 3/2001 |
| KR | 101427217 B1 | 8/2014 |
| KR | 101580368 B1 | 1/2016 |
| KR | 10-2016-0073006 A | 6/2016 |
| KR | 102145661 B1 | 8/2020 |

\* cited by examiner

REACTOR APPARATUS

CROSS-REFERENCE TO RELATED APPLICATION(S)

This application claims benefit of priority to Korean Patent Application No. 10-2021-0087146 filed on Jul. 2, 2021 in the Korean Intellectual Property Office, the disclosure of which is incorporated by reference herein in its entirety.

BACKGROUND

The present inventive concepts relate to a reactor apparatus.

A scrubber facility is used to treat toxic waste gas emitted from a facility after a semiconductor manufacturing process.

Among scrubber facilities, a burn-wet scrubber facility having a structure in which waste gas is first combusted in a combustion chamber in the scrubber and a by-product is accommodated therein using a treatment liquid is used.

SUMMARY

An aspect of the present inventive concepts is to provide a reactor apparatus capable of compensating for powder emissions, which may be a by-product of combustion, and in some cases, may cause operation of an entire semiconductor manufacturing facility to be stopped.

An aspect of the present inventive concepts is to provide a reactor apparatus capable of forming a more uniform water film on an inner surface of an inner wall portion of a water reservoir.

According to an aspect of the present inventive concepts, a reactor apparatus, includes: a reactor chamber having an inlet through which treatment liquid containing by-products is introduced and having an interior space; a burner at a lower end portion of the reactor chamber to burn waste gas; a guide member above the burner and configured to allow the treatment liquid to flow outwardly of the burner; a water reservoir between the burner and the guide member, the water reservoir having a double pipe structure having an inner wall portion and an outer wall portion, and through which water supplied through a water inlet is configured to flow between the inner wall portion and the outer wall portion; and a cover member coupled to an upper end portion of the water reservoir and configured to cover a space between the inner wall portion and the outer wall portion, wherein an upper end of the outer wall portion is above an upper end of the inner wall portion, and a plurality bumps are on a bottom surface of the cover member spaced apart from each other in a circumferential direction, the plurality of bumps configured to form a gap of several hundred μm being between the bottom surface of the cover member and an upper surface of the inner wall portion of the water reservoir.

According to an aspect of the present inventive concepts, a reactor apparatus, includes: a reactor chamber having an inlet through which treatment liquid containing by-products is introduced and having an interior space; a burner at a lower end portion of the reactor chamber configured to burn waste gas; a guide member above the burner and configured to allow the treatment liquid to flow outwardly of the burner; a water reservoir between the burner and the guide member and having a double pipe structure having an inner wall portion and an outer wall portion, and through which water supplied through a water inlet is configured to flow between the inner wall portion and the outer wall portion and is configured to flow along an upper surface and an inner surface of the inner wall portion; and a cover member coupled to an upper end portion of the water reservoir configured to provide a flow path of the water together with the inner wall portion, wherein the upper surface of the inner wall portion includes a plurality of bumps, spaced apart from each other in a circumferential direction, the plurality of bumps configured to form a gap of several hundred μm between a bottom surface of the cover member and the upper surface of the inner wall portion of the water reservoir, wherein the cover member includes a guide block configured to guide a flow path of water passing through the gap on the bottom surface, and a stepped groove on an outside of the bump in a radial direction on the bottom surface.

According to an aspect of the present inventive concepts, a reactor apparatus, includes: a water reservoir between a burner and a guide member and having a double pipe structure having an inner wall portion and an outer wall portion, and through which water supplied through a water inlet is configured to flow between the inner wall portion and the outer wall portion and is configured to flow along an upper surface and an inner surface of the inner wall portion; and a cover member coupled to an upper end portion of the water reservoir configured to provide a flow path of the water together with the inner wall portion, wherein the upper surface of the inner wall portion includes a plurality of bumps, spaced apart from each other in a circumferential direction, the plurality of bumps configured to form a gap of several hundred μm between a bottom surface of the cover member and the upper surface of the inner wall portion of the water reservoir, wherein the cover member includes a guide block configured to guide a flow path of water passing through the gap on the bottom surface, and a stepped groove on an outside of the bump in a radial direction on the bottom surface.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, preferred example embodiments of the present inventive concepts will be described with reference to the accompanying drawings.

First, a scrubber facility will be described briefly.

Figure 1:
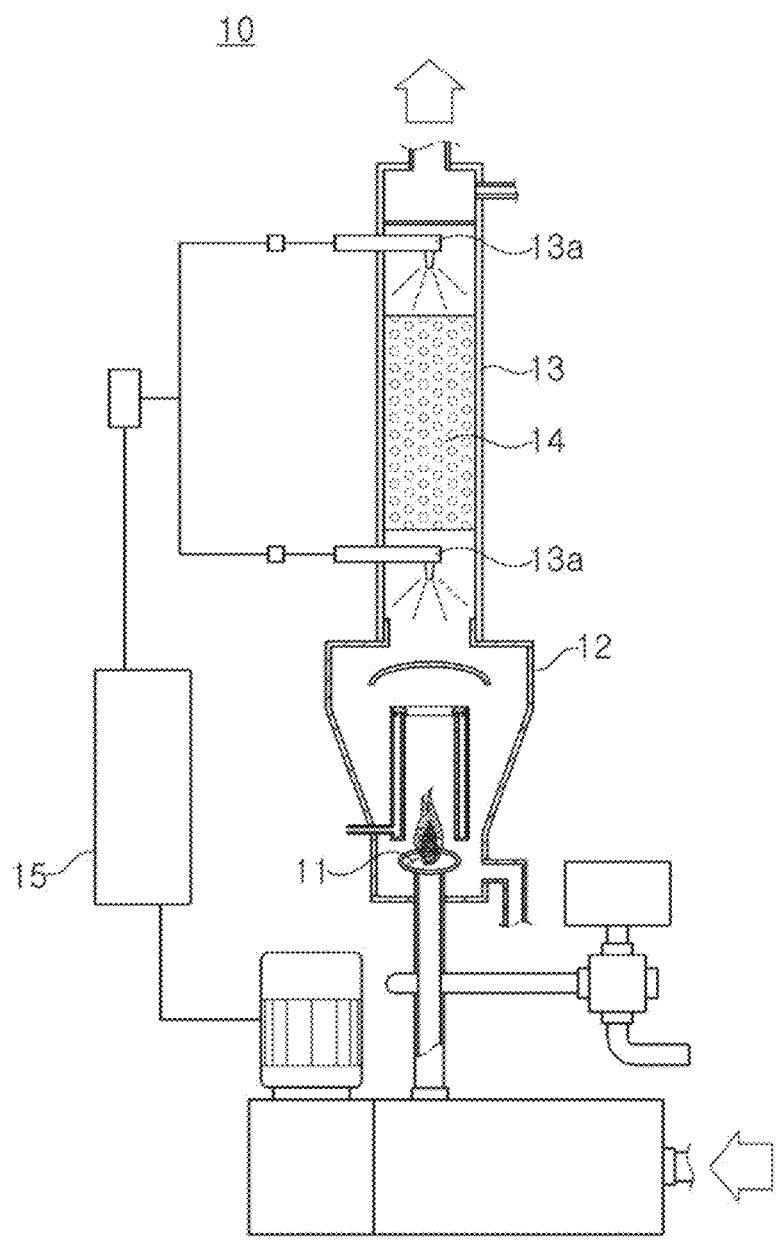
FIG. 1 is an illustrative diagram schematically illustrating a scrubber facility including a reactor apparatus according to example embodiments of the present inventive concepts.

FIG. 1 is an illustrative diagram schematically illustrating a scrubber facility including a reactor apparatus according to example embodiments of the present inventive concepts.

Referring to FIG. 1, waste gas flowing into a scrubber facility 10 passes through a reactor 12 in which a burner 11 is installed, passes through a wet absorption unit 13, and then is discharged externally. The waste gas flowing into the reactor 12 is combusted by the burner 11 to primarily remove harmful substances contained in the waste gas, and then the waste gas flowing into the wet adsorption unit 13 is accommodated in treatment liquid sprayed through a nozzle 13a, so that harmful substances are secondarily removed. Thereafter, harmful substances are removed once again while passing through an adsorbent 14 containing an absorbing material, and waste gas passing through the adsorbent is accommodated in the treatment liquid sprayed through the nozzle 13a so that the harmful substances are finally removed.

The treatment liquid may be provided to the wet adsorption unit 13 after passing through a heat exchanger 15.

As described above, the gas from which harmful substances are removed is finally discharged externally of the scrubber facility 10.

Figure 2:
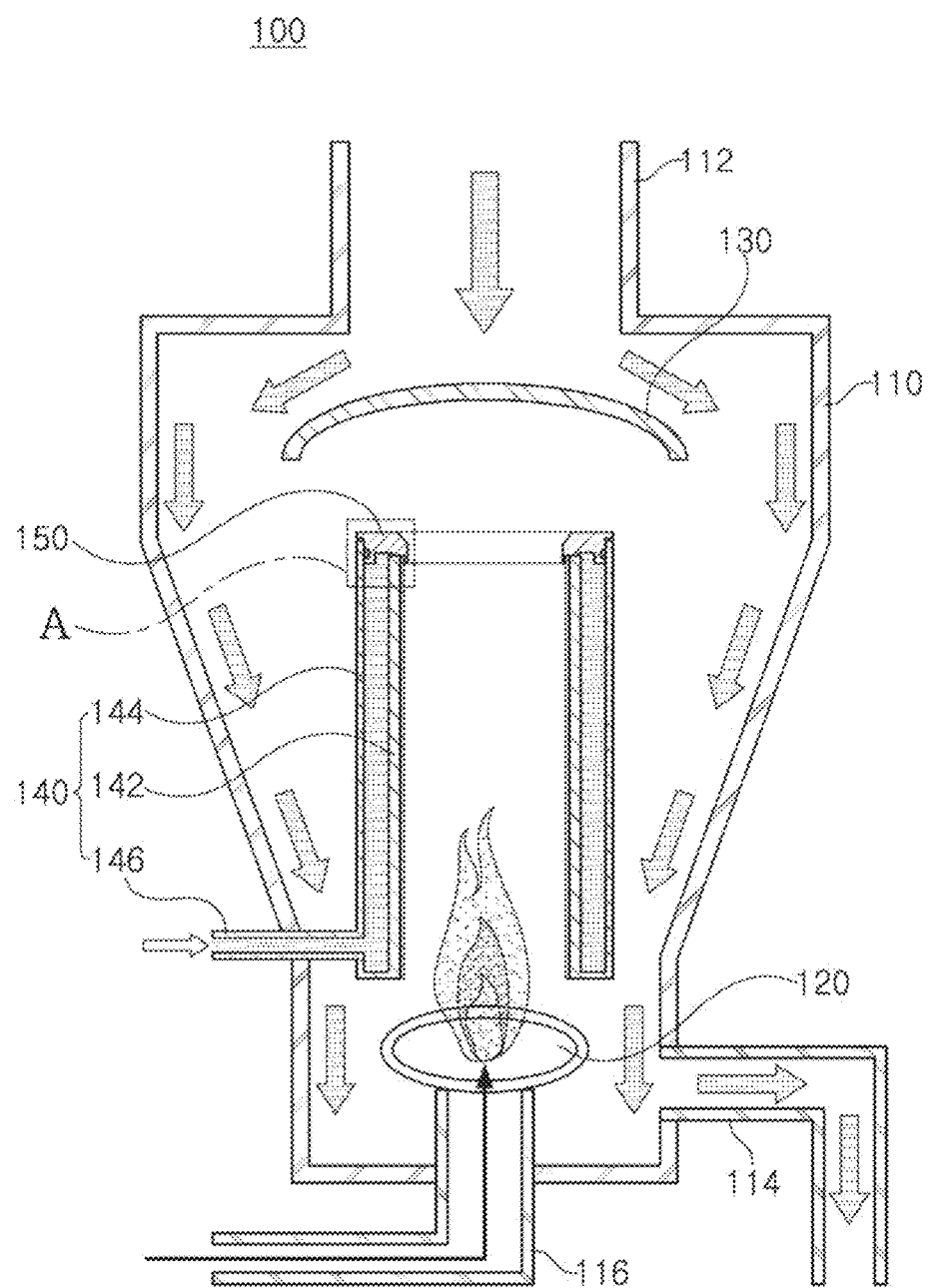
FIG. 2 is a schematic configuration diagram illustrating a reactor apparatus according to example embodiments of the present inventive concepts.

FIG. 2 is a schematic configuration diagram illustrating a reactor apparatus according to example embodiments of the present inventive concepts.

Referring to FIG. 2, a reactor apparatus 100 may include a reactor chamber 110, a burner 120, a guide member 130, a reservoir 140 (for example, a water reservoir) and/or a cover member 150.

The reactor chamber 110 has an interior space. In addition, the reactor chamber 110 is formed to extend from an upper surface thereof, and has an inlet 112 through which treatment liquid containing by-products is introduced from the wet adsorption unit 13 (please refer to FIG. 1) described above. The reactor chamber 110 has a shape in which the treatment liquid flowing into the inlet 112 flows to a lower end portion and is discharged externally. For example, the reactor chamber 110 may have a funnel shape with an upper end portion wider than a lower end portion. In addition, an outlet 114 is provided in the reactor chamber 110 so that the treatment liquid and water supplied from the water reservoir 140 can be discharged externally. As an example, the outlet 114 may be disposed below the burner 120. As described above, since the outlet 114 is provided in the reactor chamber 110, the treatment liquid, water, and by-products flowing into the reactor chamber 110 may be discharged externally of the reactor chamber 110.

In addition, a waste gas supply pipe 116 through which waste gas is supplied to the burner 120 may be connected to a bottom surface of the reactor chamber 110.

The burner 120 is disposed at a lower end portion of the reactor chamber 110, and is connected to a waste gas supply pipe 116. In addition, the burner 120 is disposed below the guide member 130, and is disposed below a hollow of the water reservoir 140. Accordingly, it is possible to reduce or prevent the treatment liquid flowing in from the inlet 112 from falling toward the burner 120. The waste gas supplied from a lower portion of the burner 120 is combusted in the burner 120, and thus, harmful substances contained in the waste gas are primarily removed.

The guide member 130 is disposed above the burner 120, and serves to allow the treatment liquid to flow externally of the burner 120. As an example, the guide member 130 is disposed below the inlet 112 of the reactor chamber 110, and allows the treatment liquid to flow externally of the water reservoir 140. To this end, the guide member 130 may have a size sufficient to cover the entire water reservoir 140. As an example, the guide member 130 may have a rounded shape such that an edge thereof is disposed below a central portion thereof. Accordingly, the treatment liquid introduced through the inlet 112 may flow along the inner surface of the reactor chamber 110. The guide member 130 may have a smaller size than an upper end portion of the reactor chamber 110 so that the waste gas can flow to the wet adsorption unit 13 (please refer to FIG. 1) disposed thereon.

A water reservoir 140 is disposed between the burner 120 and the guide member 130. The water reservoir 140 has a double-tube structure having an inner wall portion 142 and an outer wall portion 144. The water reservoir 140 may include a water inlet 146 through which water flowing through the inner wall portion 142 and the outer wall portion 144 is supplied. As an example, the water supplied through the water inlet 146 flows upwardly through a space between the inner wall portion 142 and the outer wall portion 144, and then flows down along the inner surface of the inner wall portion 142. To this end, the upper end of the outer wall portion 144 is disposed above the upper end of the inner wall portion 142. Accordingly, water flowing upwardly through the space between the inner wall portion 142 and the outer wall portion 144 may flow toward the inner surface of the inner wall portion 142.

The cover member 150 is coupled to an upper end portion of the water reservoir 140, and is disposed to cover the space between the inner wall portion 142 and the outer wall portion 144.

Figure 3:
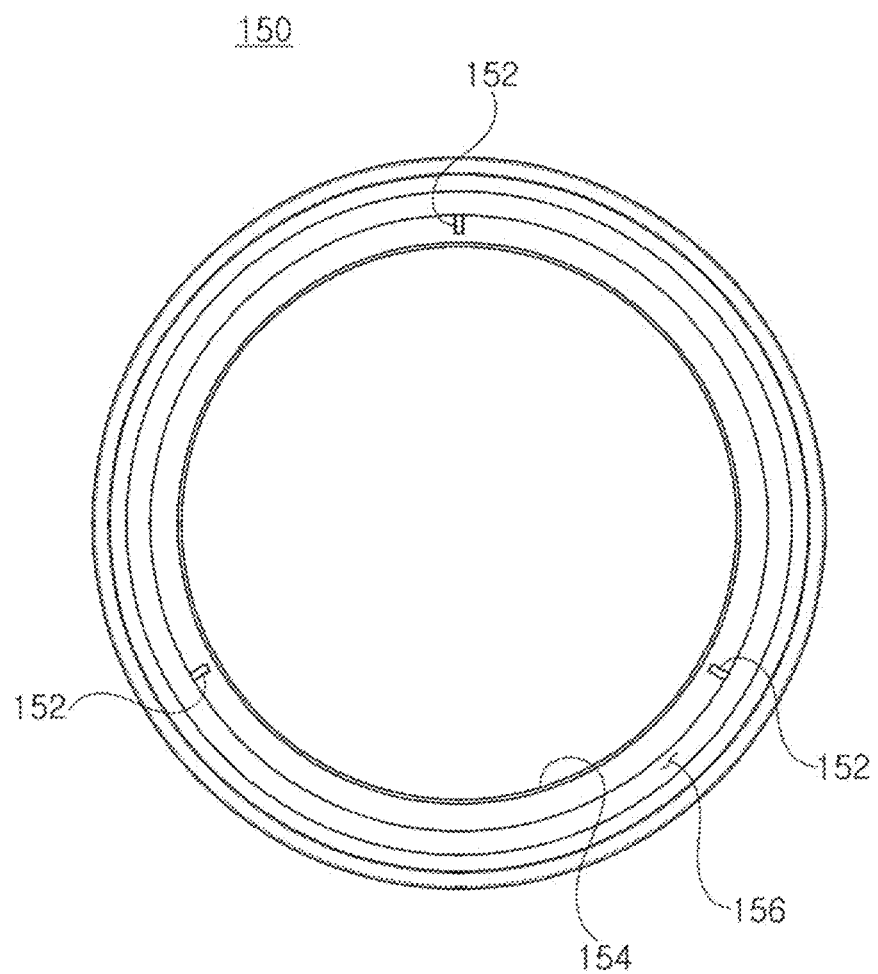
FIG. 3 is a bottom view illustrating a cover member provided in a reactor apparatus according to example embodiments of the present inventive concepts.
Figure 4:
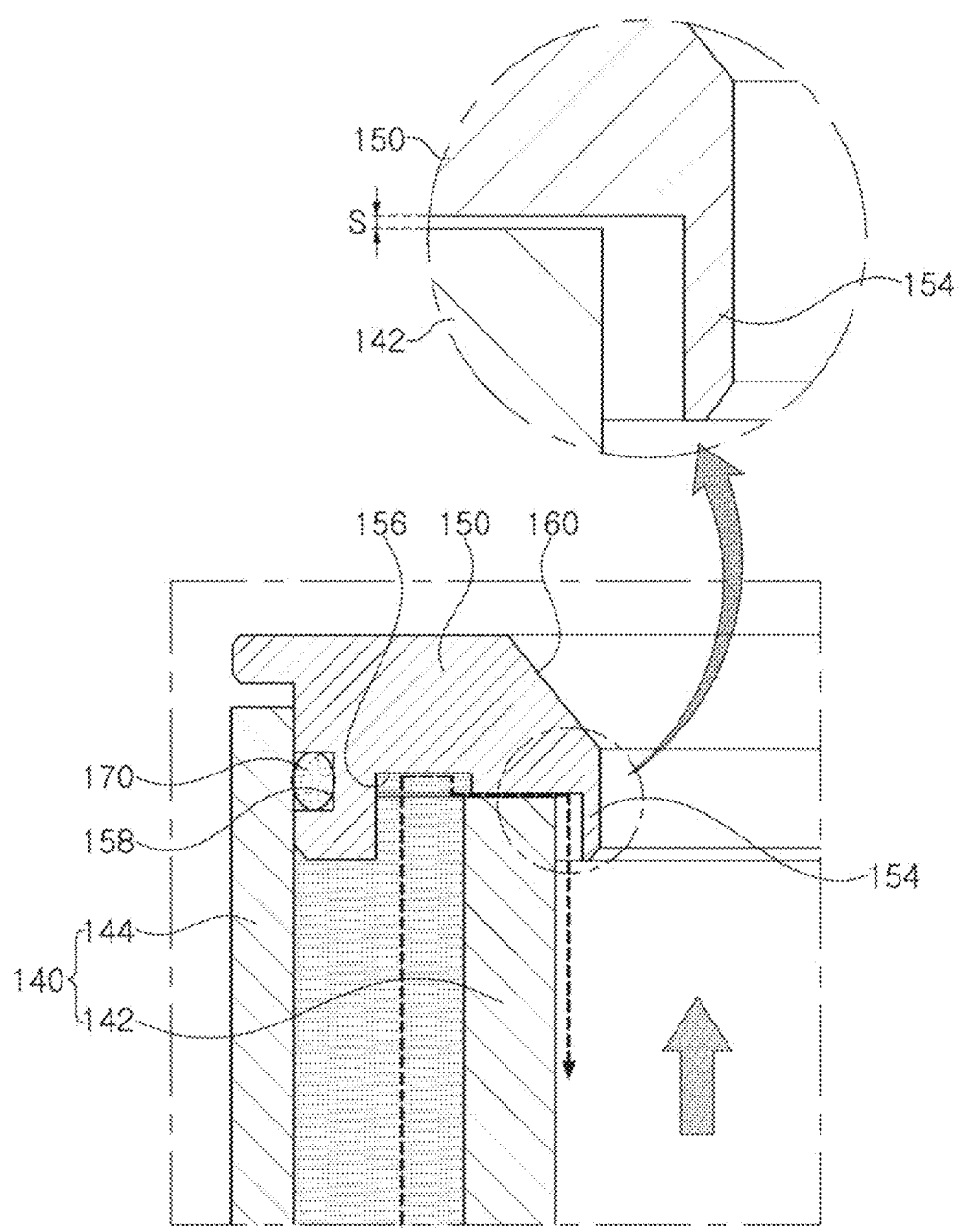
FIG. 4 is an enlarged view illustrating portion A of FIGS. 2 and 3.

FIG. 3 is a bottom view illustrating a cover member provided in a reactor apparatus according to an example embodiments of the present inventive concepts and FIG. 4 is an enlarged view showing portion A of FIGS. 2 and 3 according to example embodiments of the present inventive concepts.

Referring to FIGS. 3 and 4, a cover member 150 has a hollow shape, and, for example, may have a circular ring shape. In addition, bumps 152 are provided on a bottom surface of the cover member 150. A plurality of bumps 152 may be disposed to be spaced apart from each other in a circumferential direction, and three bumps 152 may be provided on the bottom surface of the cover member 150 as an example. The bump 152 serves to form a gap of several hundred μm between the bottom surface of the cover member 150 and an upper surface of the inner wall portion 142 of the water reservoir 140. As described above, by forming a gap S of several hundred μm between the bottom surface of the cover member 150 and the upper surface of the inner wall portion 142 of the water reservoir 140 by the bump 152, water filled in the water reservoir 140 may flow through the gap S between the bottom surface of the cover member 150 and the upper surface of the inner wall portion 142 of the water reservoir 140 by water pressure. Accordingly, while maintaining a constant flow velocity, water flows to the inner surface of the inner wall portion 142 of the water reservoir 140 so that a water film formed on the inner surface of the inner wall portion 142 of the water reservoir 140 may be more uniformly disposed. In other words, it is possible to reduce or prevent a water film from being formed on the inner surface of the inner wall portion 142 of the water reservoir 140.

A height of the bump 152 may be determined by the following Equation. That is, when a flow velocity of water at the inlet 146 of the water reservoir 140 is V1, an area of the inlet 146 is A1, a flow rate thereof is Q1, a flow velocity in a gap between the bottom surface of the cover member 150 and the upper surfaces of the inner wall portion 142 of the water reservoir 140 is V2, and an area of a gap between the bottom surface of the cover member 150 and the upper surface of the inner wall portion 142 of the water reservoir 140, that is, an area of the outlet is A2, and a flow rate thereof is Q2, the height of the bump 152 may be determined to satisfy Q1(=V1×A1)>Q2(=V2×A2).

A guide block 154 may be provided on the bottom surface of the cover member 150 for guiding a flow path of the water passing through the gap S. The guide block 154 is disposed inside the bump 152 in a radial direction. As an example, the guide block 154 may be formed at the inner end of the bottom surface of the cover member 150 to have a ring shape when viewed from the bottom. The guide block 154 serves to flow along the inner surface of the inner wall portion 142 of the water reservoir 140, the water passing through the gap S. To this end, the guide block 154 may be formed as a protrusion formed to protrude downwardly.

In addition, a stepped groove 156 disposed outside of the bump 152 in a radial direction may be provided on the bottom surface of the cover member 150. The stepped groove 156 serves to generate a pressure difference so that water can flow more smoothly through the gap S. As an example, the stepped groove 156 may have a circular band shape when viewed from below the cover member 150. As an example, the stepped groove 156 is disposed above the upper surface of the inner wall portion 142 and is disposed below the upper surface of the outer wall portion 144.

Here, when the term for the direction is defined, a radial direction refers to a direction from an outer circumferential surface of the cover member 150 toward a center of a hollow, and a circumferential direction refers to a direction of rotation along an outer circumferential surface of the cover member 150.

A sealing member 170 is installed between an outer circumferential surface of the cover member 150 and the outer wall portion 144 of the water reservoir 140. To this end, an installation groove 158 into which the sealing member 170 is inserted may be provided on the outer circumferential surface of the cover member 150. However, in some example embodiments, a case in which the installation groove 158 is formed in the cover member 150 is described as an example, but it is not limited thereto, and the installation groove 158 may be formed on the outer wall portion 144 of the water reservoir 140.

An inclined surface 160 for guiding a flow of waste gas may be provided on an inner circumferential surface of the cover member 150. The inclined surface 160 serves to allow the waste gas to flow while spreading outwardly of the cover member 150 in a radial direction. Accordingly, the waste gas may flow outwardly of the guide member 130 disposed above the reactor chamber 110 to flow upwardly more smoothly.

As described above, a more uniform water film may be formed on the inner surface of the inner wall portion 142 of the water reservoir 140 through the cover member 150. Accordingly, it is possible to reduce or prevent powder from accumulating, and it is possible to reduce or prevent powder containing a large amount of moisture from flowing down toward the burner 120 as the powder is accumulated, so that it is possible to reduce or prevent the powder containing a large amount of moisture from extinguishing the burner.

Figure 5:
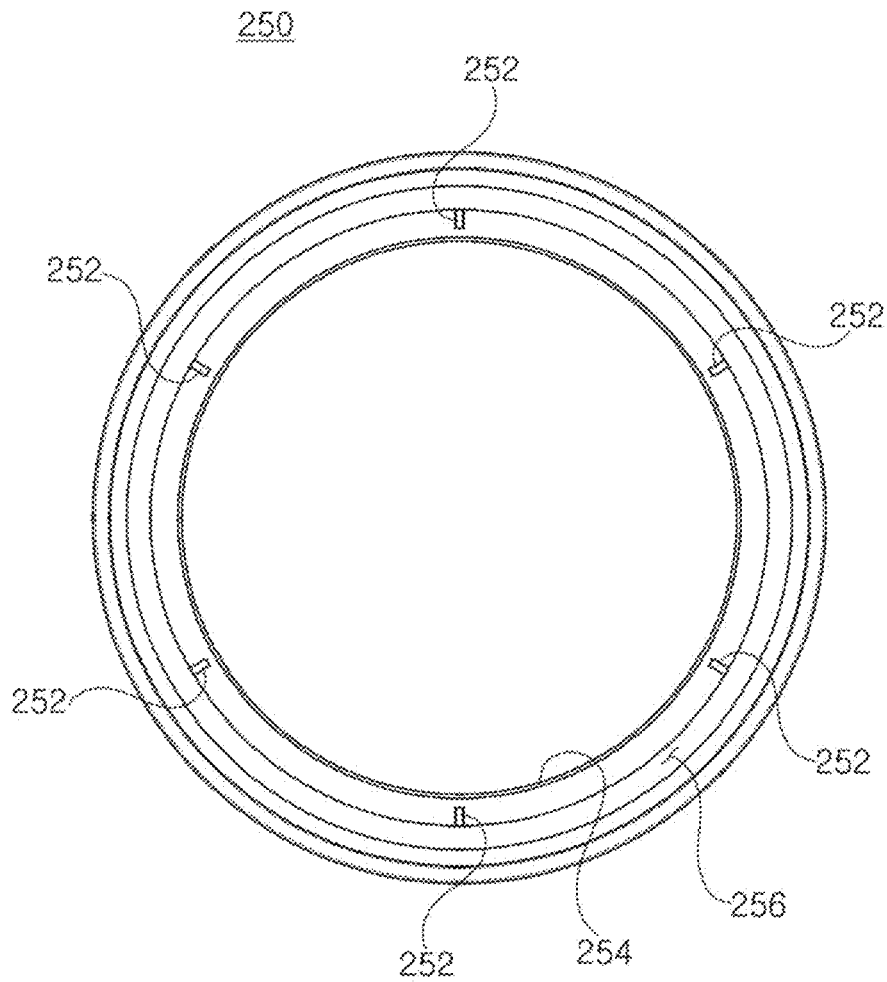
FIG. 5 is a bottom view illustrating a cover member provided in a reactor apparatus according to example embodiments of the present inventive concepts.

FIG. 5 is a bottom view illustrating a cover member provided in a reactor apparatus according to example embodiments of the present inventive concepts.

Referring to FIG. 5, a cover member 250 has a hollow shape, and may have a circular ring shape as an example. In addition, bumps 252 are provided on a bottom surface of the cover member 250. A plurality of bumps 252 may be disposed to be spaced apart from each other in a circumferential direction, and as an example, six bumps 252 may be provided on the bottom surface of the cover member 250.

A guide block 254 disposed inside of the bump 252 in a radial direction may be provided on the bottom surface of the cover member 250, and the guide block 254 may have a circular ring shape when viewed from below.

In addition, a stepped groove 256 disposed on an outside of the bump 252 in a radial direction may be provided on the bottom surface of the cover member 250.

Figure 6:
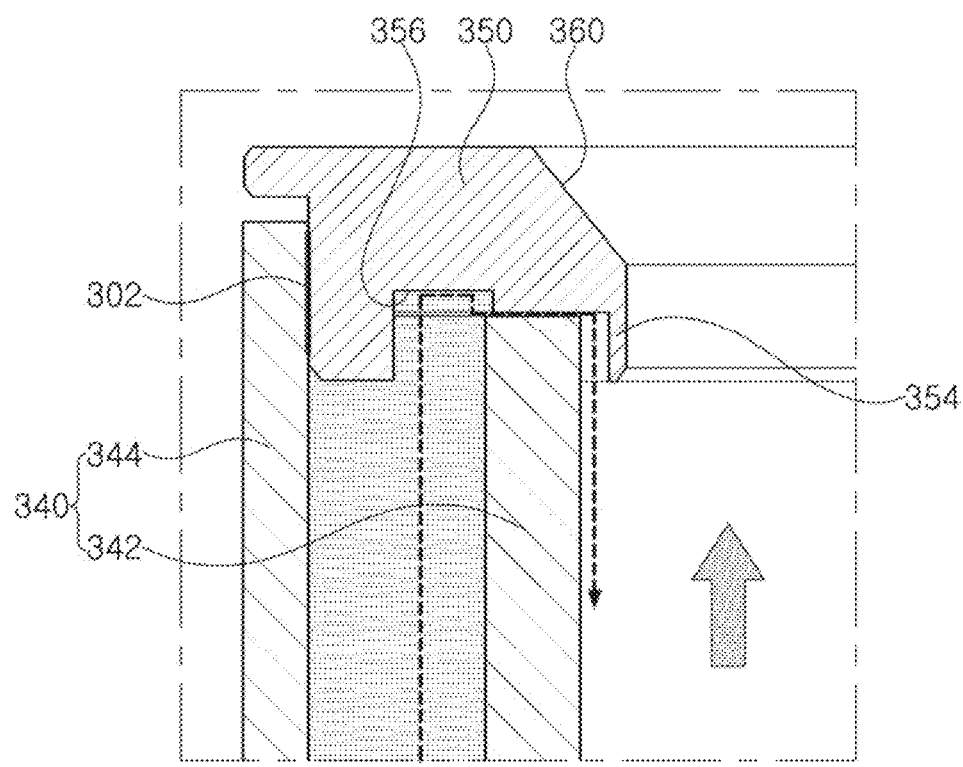
FIG. 6 is a schematic cross-sectional view illustrating a portion of a cover member and a water reservoir provided in a reactor apparatus according to example embodiments of the present inventive concepts.

FIG. 6 is a schematic cross-sectional view illustrating a portion of a cover member and a water reservoir provided in a reactor apparatus according to example embodiments of the present inventive concepts.

Referring to FIG. 6, a cover member 350 and a water reservoir 340 may be joined by welding. As an example, a joint portion 302 joined by welding may be formed on an outer circumferential surface of the cover member 350 and an inner surface of the outer wall portion 344 of the water reservoir 340. As described above, it is possible to reduce or prevent water flowing into a space between the inner wall portion 342 and the outer wall portion 344 from flowing toward an outer surface of the outer wall portion 344 by the joint portion 302. Furthermore, the end of the outer wall portion 344 may be disposed above the end of the inner wall portion 342. Accordingly, it is possible to reduce or prevent water from flowing toward the outer surface of the outer wall portion 344.

The cover member 350 may be provided with a bump (not shown), a guide block 354, a stepped groove 356, and/or an inclined surface 360, that are the same or substantially the same configurations as those of the cover member 150 described above. Accordingly, detailed descriptions of the bump (not shown), the guide block 354, the stepped groove 356 and/or the inclined surface 360 will be omitted.

Figure 7:
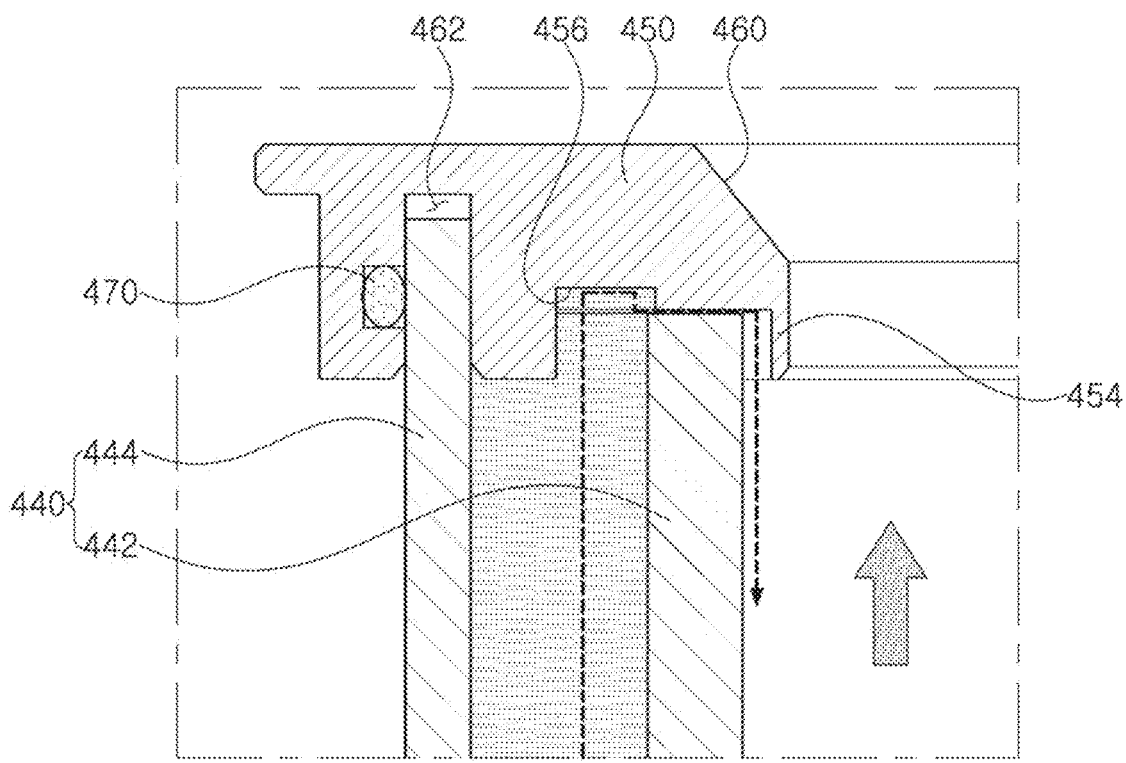
FIG. 7 is a schematic cross-sectional view illustrating a portion of a cover member and a water reservoir provided in a reactor apparatus according to example embodiments of the present inventive concepts.

FIG. 7 is a schematic cross-sectional view illustrating a portion of a cover member and a water reservoir provided in a reactor apparatus according to example embodiments of the present inventive concepts.

Referring to FIG. 7, a cover member 450 is provided with an installation groove 458 into which a sealing member 470 is inserted. The sealing member 470 is installed in the installation groove 458 so as to be in contact with an outer surface of the outer wall portion 444 of the water reservoir 440. As described above, by increasing a size of the cover member 450, the cover member 450 may be installed in the water reservoir 440 so that an upper end portion of the outer wall portion 444 is coupled to a coupling groove 462 of the cover member 450. In some example embodiments, the installation groove 458 may be connected to the coupling groove 462.

The cover member 450 may be provided with a bump (not shown), a guide block 454, a stepped groove 456, and/or an inclined surface 460, that are the same or substantially the same configurations as those of the cover member 150 described above. Accordingly, detailed descriptions of the bump (not shown), the guide block 454, the stepped groove 456 and/or the inclined surface 460 will be omitted.

Figure 8:
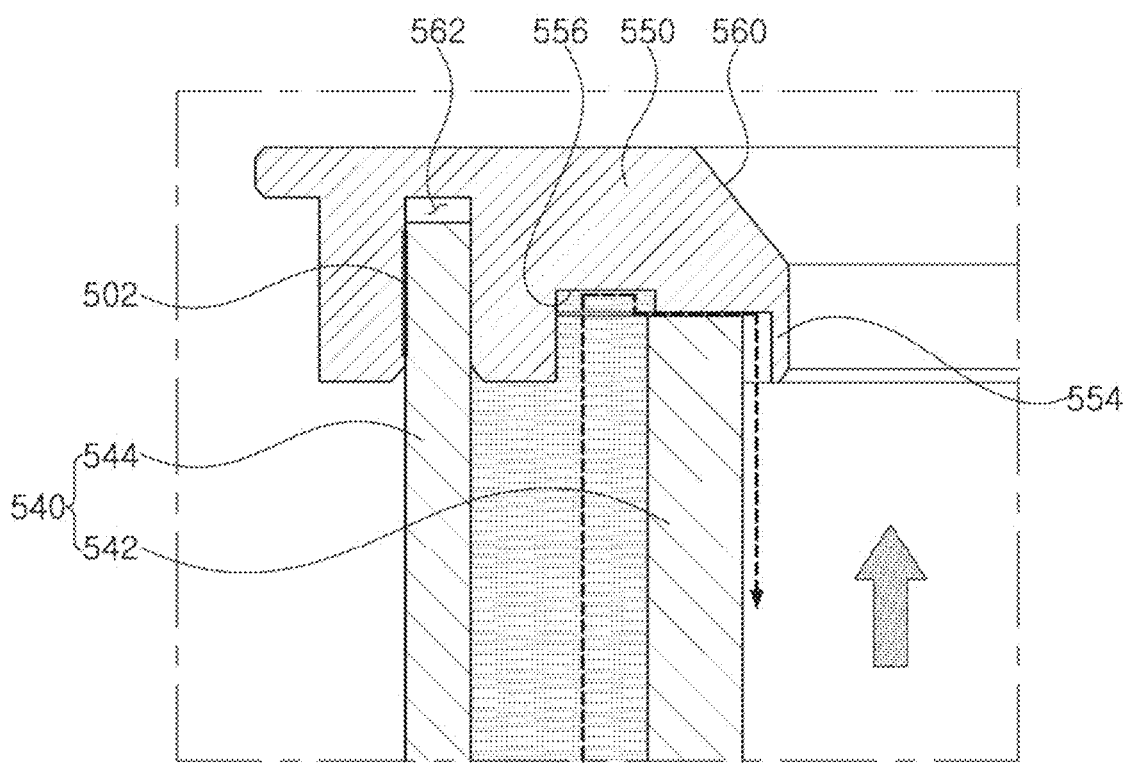
FIG. 8 is a schematic cross-sectional view illustrating a portion of a cover member and a water reservoir provided in a reactor apparatus according to example embodiments of the present inventive concepts.

FIG. 8 is a schematic cross-sectional view illustrating a portion of a cover member and a water reservoir provided in a reactor apparatus according to example embodiments of the present inventive concepts.

Referring to FIG. 8, a cover member 550 and a water reservoir 540 may be joined by welding. As an example, a joint portion 502 joined by welding may be formed on one surface of a coupling groove 562 of the cover member 550 and an outer surface of the outer wall portion 544 of the water reservoir 540. As described above, water flowing into a space between the inner wall portion 542 and the outer wall portion 544 by the joint portion 502 can be reduced or prevented from flowing toward a lower portion of the outer surface of the outer wall portion 544. Furthermore, the end of the outer wall portion 544 may be disposed above the end of the inner wall portion 542. Accordingly, it is possible to reduce or prevent water from flowing toward the outer surface of the outer wall portion 544.

The cover member 550 may be provided with a bump (not shown), a guide block 554, a stepped groove 556, and/or an inclined surface 560, having the same or substantially the same configurations as those of the cover member 150 described above. Accordingly, detailed descriptions of the bump (not shown), the guide block 554, the stepped groove 556 and/or the inclined surface 560 will be omitted.

Figure 9:
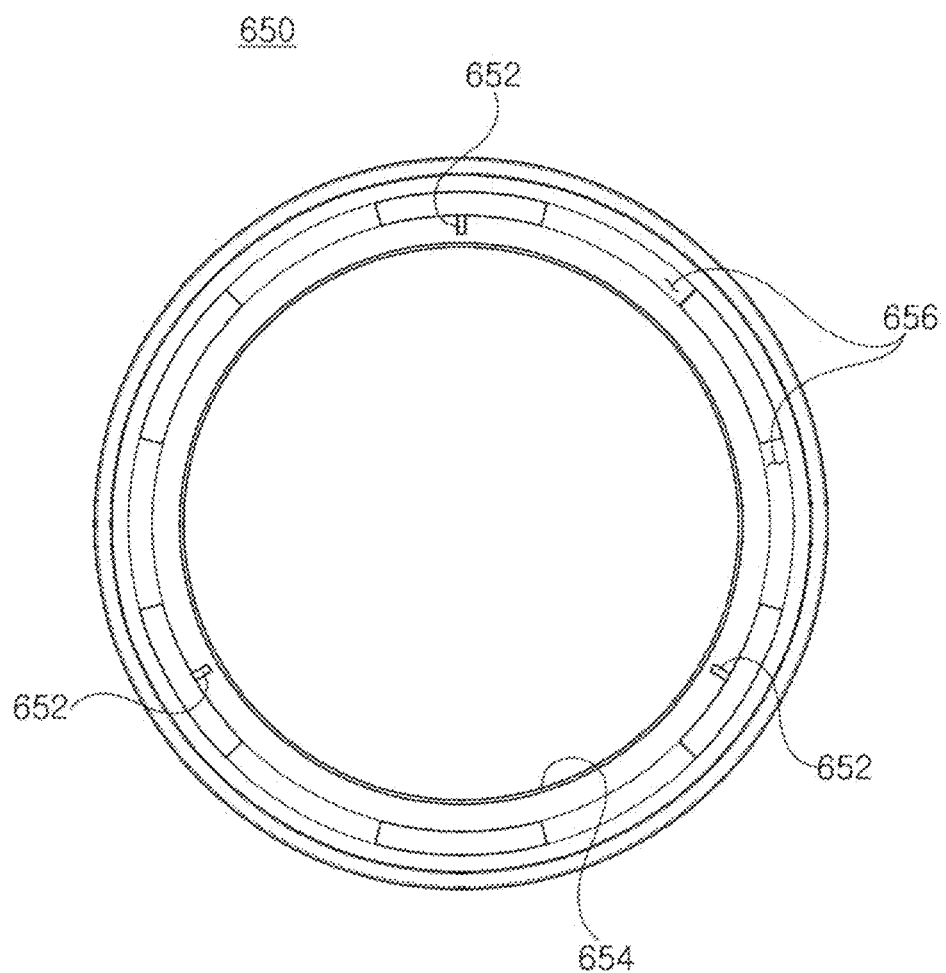
FIG. 9 is a bottom view illustrating a cover member provided in a reactor apparatus according to example embodiments of the present inventive concepts.

FIG. 9 is a bottom view illustrating a cover member provided in a reactor apparatus according to example embodiments of the present inventive concepts.

Referring to FIG. 9, a cover member 650 has a hollow shape, and may have a circular ring shape as an example. In addition, a bump 652 is provided on a bottom surface of the cover member 650. The plurality of bumps 652 may be disposed to be spaced apart from each other in a circumferential direction, and three bumps 652 may be provided on the bottom surface of the cover member 650 as an example.

A guide block 654 disposed inside the bump 652 in a radial direction may be provided on the bottom surface of the cover member 650, and the guide block 654 may have a circular ring shape when viewed from below.

In addition, a stepped groove 656 disposed outside of the bump 652 in a radial direction may be provided on the bottom surface of the cover member 650. As an example, a plurality of stepped grooves 656 may be disposed to be spaced apart from each other in a circumferential direction.

Figure 10:
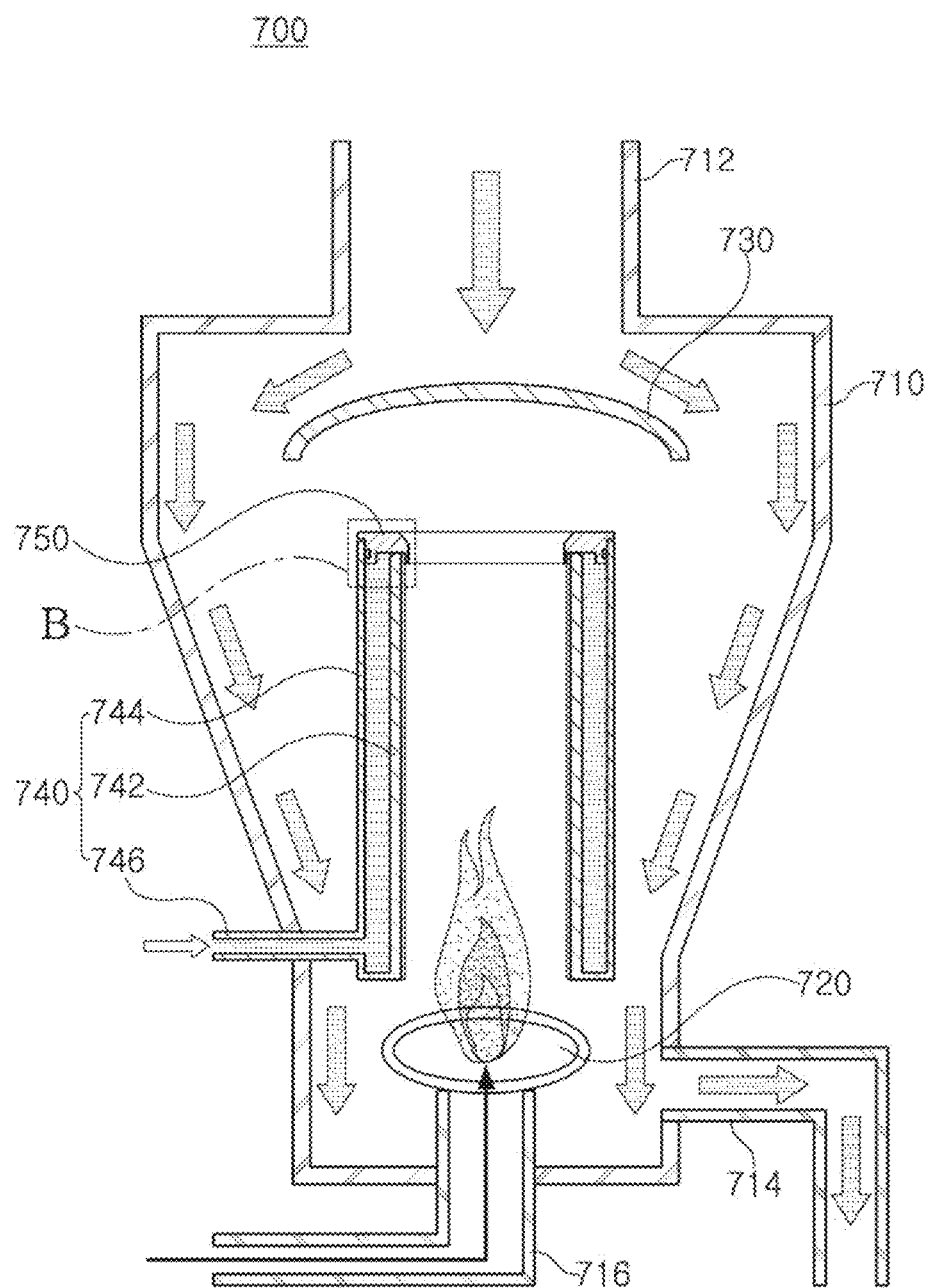
FIG. 10 is a schematic configuration diagram illustrating a reactor apparatus according to example embodiments of the present inventive concepts.
Figure 11:
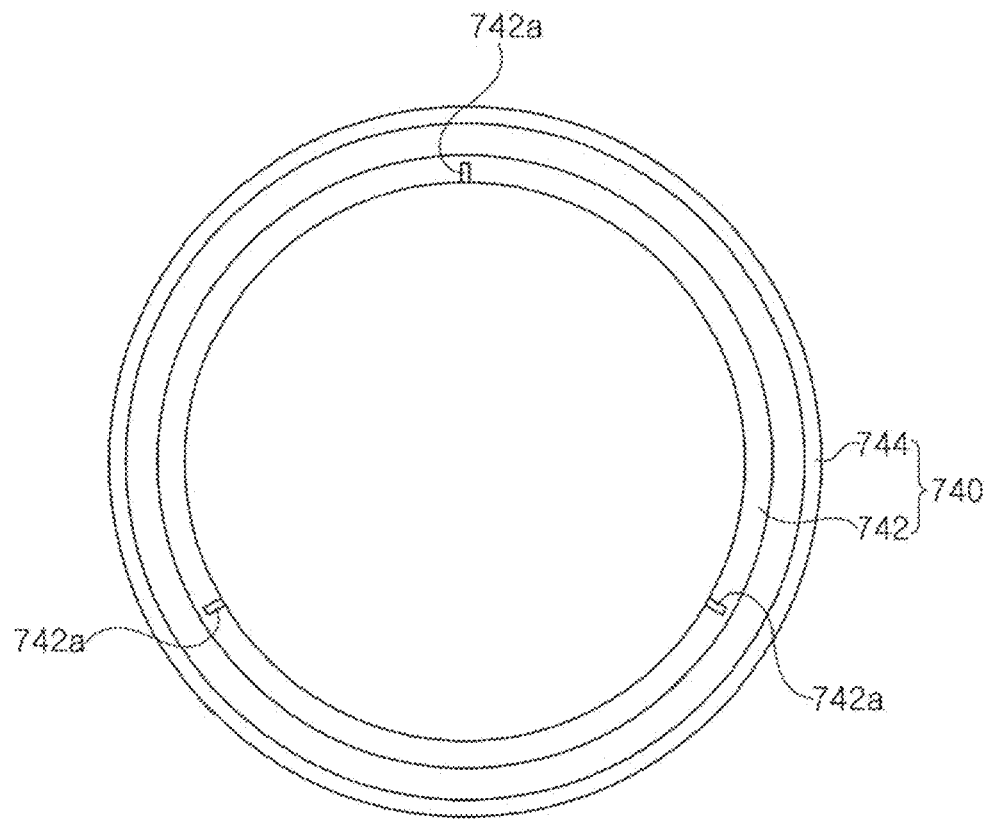
FIG. 11 is a plan view illustrating a cover member of a reactor apparatus according to example embodiments of the present inventive concepts.
Figure 12:
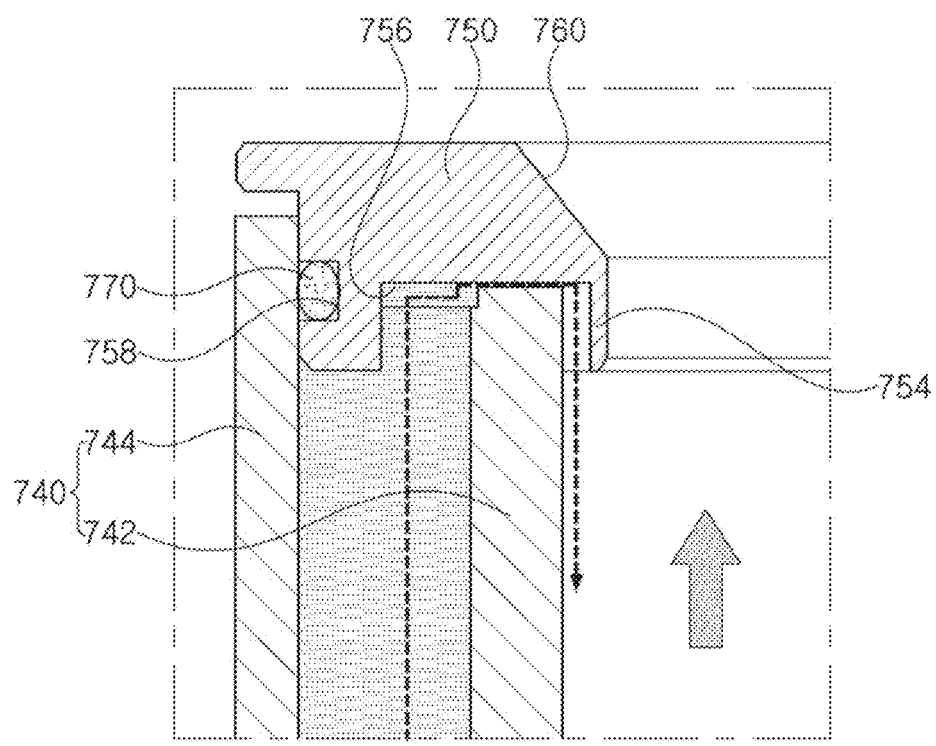
FIG. 12 is an enlarged view illustrating portion B of FIG. 10.

FIG. 10 is a schematic block diagram illustrating a reactor apparatus according to example embodiments of the present inventive concepts, FIG. 11 is a plan view illustrating a cover member of a reactor apparatus according to example embodiments of the present inventive concepts, and FIG. 12 is an enlarged view illustrating portion B of FIG. 10.

Referring to FIGS. 10 to 12, a reactor apparatus 700 may include a reactor chamber 710, a burner 720, a guide member 730, a water reservoir 740, and/or a cover member 750.

The reactor chamber 710 has an interior space. In addition, the reactor chamber 710 is formed to extend from an upper surface thereof, and has an inlet 712 through which treatment liquid containing by-products is introduced from the above-described wet adsorption unit 13 (see FIG. 1). The reactor chamber 710 has a shape in which the treatment liquid introduced through the inlet 712 flows to a lower end portion and is discharged externally. For example, the reactor chamber 710 may have a funnel shape having an upper end portion wider than a lower end portion. In addition, the reactor chamber 710 is provided with an outlet 114 so that the treatment liquid and water supplied from the water reservoir 740 can be discharged externally. The outlet 714 may be disposed below the burner 720, for example. As described above, since the outlet 714 is provided in the reactor chamber 710, treatment liquid, water, and by-products, flowing into the reactor chamber 710, may be discharged externally of the reactor chamber 710.

The outlet 714 may be disposed below the burner 720, for example. As described above, since the outlet 714 is provided in the reactor chamber 710, a treatment liquid, water, and by-products, flowing into the reactor chamber 710, may be discharged externally of the reactor chamber 710. In addition, a waste gas supply pipe 716 through which waste gas is supplied toward the burner 720 may be connected to a bottom surface of the reactor chamber 710.

The burner 720 is disposed at a lower end portion of the reactor chamber 710, and is connected to the waste gas supply pipe 716. In addition, the burner 720 is disposed below the guide member 730, and disposed below a hollow of the water reservoir 740. Accordingly, it is possible to reduce or prevent the treatment liquid flowing through the inlet 712 from falling toward the burner 720. The water gas supplied from a lower portion of the burner 720 is combusted through the burner 720, and accordingly, harmful substances contained in the waste gas are primarily removed.

The guide member 730 is disposed above the burner 720, and serves to allow the treatment liquid to flow outwardly of the burner 720. As an example, the guide member 730 is disposed below the inlet 712 of the reactor chamber 720, and allows the treatment liquid to flow outwardly of the water reservoir 740. To this end, the guide member 730 may have a size to cover the entire water reservoir 740. The guide member 720 may have a rounded shape such that, for example, an edge thereof is disposed to be lower than a central portion thereof. Accordingly, treatment liquid flowing into the inlet 712 may flow along an inner surface of the reactor chamber 710. In addition, the guide member 730 may have a smaller size than an upper end portion of the reactor chamber 710 so that the waste gas may flow to the wet adsorption unit 13 (please refer to FIG. 1) disposed thereabove.

The water reservoir 740 is disposed between the burner 720 and the guide member 730. The water reservoir 740 has a double-tube structure having an inner wall portion 742 and an outer wall portion 744. The water reservoir 740 may include a water inlet 746 through which water flowing between the inner wall portion 742 and the outer wall portion 744 is supplied. As an example, the water supplied through the water inlet 746 flows upwardly through the space between the inner wall portion 742 and the outer wall portion 744, and then flows downwardly along the inner surface of the inner wall portion 742. To this end, an upper end of the outer wall portion 744 is disposed above an upper end of the inner wall portion 742. Accordingly, water flowing upwardly through the space between the inner wall portion 742 and the outer wall portion 744 may flow toward the inner surface of the inner wall portion 742.

As shown in FIG. 11, bumps 742a are provided on an upper surface of the inner wall portion 742. A plurality of bumps 742a are disposed to be spaced apart from each other in a circumferential direction, and three bumps 742a may be provided on the upper surface of the inner wall portion 742 as an example. The bump 742a serves to form a gap of several hundred μm between the bottom surface of the cover member 750 and the upper surface of the inner wall 742 of the water reservoir 740. As described above, by forming a gap S of several hundred μm between the bottom surface of the cover member 750 and the upper surface of the inner wall portion 742 of the water reservoir 740 by the bumps 742a, water filled in the water reservoir 740 may flow through the gap S between the bottom surface of the cover member 750 and the upper surface of the inner wall portion 742 of the water reservoir 740 through water pressure. Accordingly, while maintaining a constant flow velocity, water flows to the inner surface of the inner wall portion 742 of the water reservoir 740 so that a water film formed on the inner surface of the inner wall portion 742 of the water reservoir 740 may be more uniformly disposed. In other words, it is possible to reduce or prevent a water film from being formed on the inner surface of the inner wall portion 742 of the water reservoir 740.

A height of the bump 742a may be determined by the follow Equation. That is, when a flow velocity of water at the inlet 746 of the water reservoir 740 is V1, an area of the inlet 746 is A1, a flow rate thereof is Q1, a flow velocity in a gap between the bottom surface of the cover member 750 and the upper surfaces of the inner wall portion 742 of the water reservoir 740 is V2, and an area of a gap between the bottom surface of the cover member 750 and the upper surface of the inner wall portion 742 of the water reservoir 740, that is, an area of the outlet is A2, and a flow rate thereof is Q2, the height of the bump 742a may be determined to satisfy $Q1(=V1 \times A1) > Q2(=V2 \times A2)$.

The cover member 750 is coupled to an upper end portion of the water reservoir 740, and is disposed to cover a space between the outer wall portion 744 and the inner wall portion 742. As an example, the cover member 750 may have a hollow shape, and as an example, may have a circular ring shape.

As shown in more detail in FIG. 12, a guide block 754 for guiding a flow of water passing through the gap S may be provided on a bottom surface of the cover member 750. The guide block 754 is disposed radically inside the bump on 742a. As an example, the guide block 754 may be formed at an inner end of the bottom surface of the cover member 750 to have a ring shape when viewed from the bottom. The guide block 754 serves to flow the water passing through the gap S along the inner surface of the inner wall portion 742 of the water reservoir 740. To this end, the guide block 754 may be formed of a protrusion formed to protrude downwardly.

In addition, a stepped groove 756 disposed externally on the bump 742a in a radial direction may be provided on a bottom surface of the cover member 750. The stepped groove 756 serves to generate a pressure difference so that water can flow more smoothly through the gap S. As an example, the stepped groove 756 may have a circular band shape when viewed from below the cover member 750. As an example, the stepped groove 756 is disposed above the upper surface of the inner wall portion 742 and is disposed below the upper surface of the outer wall portion 744.

A sealing member 770 is installed between an outer circumferential surface of the cover member 750 and the outer wall portion 744 of the water reservoir 740. To this end, an installation groove 758 into which the sealing member 770 is inserted may be provided on the outer circumferential surface of the cover member 750. However, in the present example embodiments, a case in which the installation groove 758 is formed in the cover member 750 is described as an example, but it is not limited thereto, and the installation groove 758 may also be formed in the outer wall portion 744 of the water reservoir 740.

In addition, an inclined surface 760 for guiding a flow of waste gas may be provided on an inner circumferential surface of the cover member 750. The inclined surface 760 serves to allow the waste gas to flow while spreading outwardly of the cover member 750 in a radial direction. Accordingly, the waste gas may flow outwardly of the guide member 730 disposed above the reactor chamber 710 to flow upwardly more smoothly.

As described above, a more uniform water film may be formed on the inner surface of the inner wall portion 752 of the water reservoir 740 through the cover member 750. Accordingly, it is possible to reduce or prevent powder from being stacked, and it is possible to reduce or prevent the powder containing a large amount of moisture from flowing down toward the burner 720 as the powder is accumulated, so that it is possible to reduce or prevent powder containing a large amount of moisture from extinguishing the burner.

As set forth above, according to the present inventive concepts, a reactor apparatus capable of forming a more uniform water film on an inner surface of an inner wall portion of a water reservoir may be provided.

The various and advantageous advantages and effects of the present inventive concepts are not limited to the above description, and can be more easily understood in the course of describing specific example embodiments of the present inventive concepts.

While example embodiments have been illustrated and described above, it will be apparent to those skilled in the art that modifications and variations could be made without departing from the scope of the present inventive concepts as defined by the appended claims.

What is claimed is:

1. A reactor apparatus, comprising:
   a reactor chamber having an inlet through which treatment liquid containing by-products is introduced and having an interior space;
   a burner at a lower end portion of the reactor chamber configured to burn waste gas;
   a guide member above the burner and configured to allow the treatment liquid to flow outwardly of the burner;
   a water reservoir between the burner and the guide member, the water reservoir having a double pipe structure having an inner wall portion and an outer wall portion, and through which water supplied through a water inlet is configured to flow between the inner wall portion and the outer wall portion; and
   a cover member coupled to an upper end portion of the water reservoir and configured to cover a space between the inner wall portion and the outer wall portion,
   wherein an upper end of the outer wall portion is above an upper end of the inner wall portion,
   wherein a bottom surface of the cover member includes a plurality of bumps spaced apart from each other in a circumferential direction, the plurality of bumps configured to form a gap of several hundred μm between the bottom surface of the cover member and an upper surface of the inner wall portion of the water reservoir.

2. The reactor apparatus of claim 1, wherein the plurality of bumps are on the bottom surface of the cover member in contact with the inner wall portion.

3. The reactor apparatus of claim 2, wherein the cover member further comprises a guide block on a bottom surface of the guide member, configured to guide a flow path of water passing through the gap.

4. The reactor apparatus of claim 3, wherein the cover member further comprises a stepped groove on the bottom surface of the cover member on an outside of at least one of the plurality of bumps in a radial direction.

5. The reactor apparatus of claim 4, wherein the stepped groove is above the upper surface of the inner wall portion and below an upper surface of the outer wall portion.

6. The reactor apparatus of claim 1, wherein the cover member further comprises a sealing member between an outer circumferential surface of the cover member and the outer wall portion.

7. The reactor apparatus of claim 1, wherein the cover member has a circular ring shape having a hollow.

8. The reactor apparatus of claim 1, wherein an inner circumferential surface of the cover member has an inclined surface configured to guide a flow of waste gas.

9. The reactor apparatus of claim 1, wherein the cover member and the outer wall portion are joined by welding.

10. The reactor apparatus of claim 1, wherein the cover member further comprises a sealing member between an outer surface of the outer wall portion and a coupling groove of the cover member.

11. The reactor apparatus of claim 1, wherein the reactor chamber further comprises an outlet through which the treatment liquid introduced into the inlet and the water supplied to the water reservoir are discharged, the outlet being below the burner.

12. The reactor apparatus of claim 11, wherein the reactor chamber includes a funnel shape having an upper end portion thereof wider than a lower end portion.

13. A reactor apparatus, comprising:
a reactor chamber having an inlet through which treatment liquid containing by-products is introduced and having an interior space;
a burner at a lower end portion of the reactor chamber configured to burn waste gas;
a guide member above the burner and configured to allow the treatment liquid to flow outwardly of the burner;
a water reservoir between the burner and the guide member and having a double pipe structure having an inner wall portion and an outer wall portion, and through which water supplied through a water inlet is configured to flow between the inner wall portion and the outer wall portion and is configured to flow along an upper surface of the inner wall portion and an inner surface of the inner wall portion; and
a cover member coupled to an upper end portion of the water reservoir configured to provide a flow path of the water together with the inner wall portion,
wherein the upper surface of the inner wall portion includes a plurality of bumps, spaced apart from each other in a circumferential direction, the plurality of bumps configured to form a gap of several hundred μm between a bottom surface of the cover member and the upper surface of the inner wall portion of the water reservoir,
wherein the cover member includes a guide block configured to guide a flow path of water passing through the gap on the bottom surface of the cover member, and a stepped groove on an outside of at least one of the plurality of bumps in a radial direction on the bottom surface of the cover member.

14. The reactor apparatus of claim 13, wherein the plurality of bumps are provided on the upper surface of the inner wall portion and configured to contact the bottom surface of the cover member.

15. The reactor apparatus of claim 14, wherein an upper end of the outer wall portion is above an upper end of the inner wall portion.

16. The reactor apparatus of claim 13, wherein the cover member further comprises a sealing member between an outer circumferential surface of the cover member and the outer wall portion.

17. The reactor apparatus of claim 13, wherein the stepped groove is above the upper surface of the inner wall portion and is below an upper surface of the outer wall portion.

18. A reactor apparatus, comprising:
a water reservoir between a burner and a guide member and having a double pipe structure having an inner wall portion and an outer wall portion, and through which water supplied through a water inlet is configured to flow between the inner wall portion and the outer wall portion and is configured to flow along an upper surface of the inner wall portion and an inner surface of the inner wall portion; and
a cover member coupled to an upper end portion of the water reservoir configured to provide a flow path of the water together with the inner wall portion,
wherein the upper surface of the inner wall portion includes a plurality of bumps, spaced apart from each other in a circumferential direction, the plurality of bumps configured to form a gap of several hundred μm between a bottom surface of the cover member and the upper surface of the inner wall portion of the water reservoir,
wherein the cover member includes a guide block configured to guide a flow path of water passing through the gap on the bottom surface of the cover member, and a stepped groove on an outside of at least one of the plurality of bumps in a radial direction on the bottom surface of the cover member.

19. The reactor apparatus of claim 18, wherein an inner circumferential surface of the cover member has an inclined surface configured to guide a flow of waste gas.

20. The reactor apparatus of claim 18, wherein the cover member further comprises a sealing member between an outer surface of the outer wall portion and a coupling groove of the cover member.

* * * * *